J. H. HOBBS, W. LEIGHTON, Jr. & C. H. BROCKUNIER.
Stemmed Glass-Ware.
No. 156,569.                                   Patented Nov. 3, 1874.
Fig. 2.                    Fig. 1.
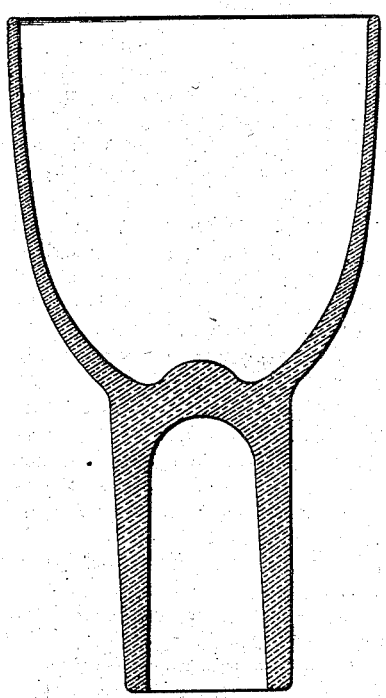
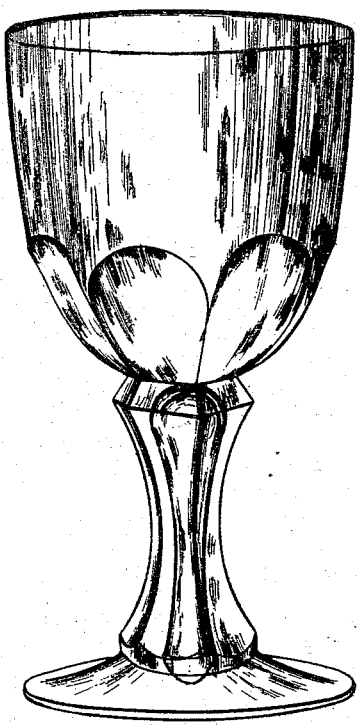
Witnesses.                 Inventor.

UNITED STATES PATENT OFFICE.

JOHN H. HOBBS, WILLIAM LEIGHTON, JR., AND CHARLES W. BROCKUNIER, OF WHEELING, WEST VIRGINIA.

IMPROVEMENT IN STEMMED GLASSWARE.

Specification forming part of Letters Patent No. 156,569, dated November 3, 1374; application filed August 18, 1874.

*To all whom it may concern:*

Be it known that we, JOHN H. HOBBS, WILLIAM LEIGHTON, Jr., and CHARLES W. BROCKUNIER, of Wheeling, in the county of Ohio and State of West Virginia, have invented a new and useful Improvement in Hollow-Stemmed Glassware; and we do hereby declare that the following is a full, clear, and exact description of the same, reference being had to the annexed drawings making part of this specification, in which—

Figure 1 represents a pressed goblet, having in its stem, hermetically sealed, a bubble of air; and Fig. 2 is a vertical section, showing a bowl and stem as they come from the mold, to be finished into the form shown in Fig. 1.

Our improvement relates to the manufacture of stemmed glassware, by pressing in a mold the stem and foot or bowl, afterward finished so as to preserve, hermetically, a bubble of air in the stem. This result has heretofore been unattained in pressed ware, and its accomplishment enables us to give all the beauty of effect which has heretofore only been attained at an increased expense by blowing.

The following description will enable persons skilled in the art to practice our invention.

The bowl and stem are first pressed in the form shown in Fig. 2. This may be done by means of a mold having in the base a projection to form the hollow stem at the same time that the bowl is formed by the plunger. When the bowl and stem have been formed, the mold is opened and the bowl is seized by the "snaps," and the smaller end exposed to the heat of a heating-furnace until the glass has become plastic, and then it is "tooled" by the workman into the form designed for the exterior of the stem. When finished, the lower end is closed so as to be hermetically sealed, and while it is still plastic the foot is welded to or formed upon it.

We have described one manner of construction; but we do not wish to be confined to any one mode of manufacture, for when once the general principle is suggested, many different methods of manufacture may be readily contrived by any one skilled in the art. Instead of attaching the bowl and stem to a pressed foot, the foot may be blown onto the finished stem; or the stem and foot may be made in one piece and finished by tooling, and then the bowl or upper part may be joined to the stem by pressing, blowing, or cementing; or the foot may be flanged out by tooling. Our invention differs from all before-known methods of manufacture, in that, instead of blowing, we make the air-bubble in finished stemmed pressed ware by first pressing the stem open at one end, and then inclosing the bubble by compressing and sealing the end.

What we claim as our invention, and desire to secure by Letters Patent, is—

1. As an improvement in the art of making pressed stemmed glassware, first pressing the stem with an open recess in the end, and then, after tooling the stem into the desired form, and hermetically sealing the open end so as to confine an air-bubble, connecting the stem with the other portion of the article by any of the known modes.

2. As a new article of manufacture, pressed stemmed glassware having an air-bubble in the stem, substantially such as set forth.

In testimony whereof we have signed our names to this specification in the presence of two subscribing witnesses.

JOHN H. HOBBS.
WILLIAM LEIGHTON, JR.
CHARLES W. BROCKUNIER.

Witnesses:
LUCIEN B. MARTIN,
B. M. HILDRETH.